June 25, 1968     M. DUBACH     3,390,076
METHOD AND APPARATUS FOR SEWAGE DISPOSAL ACCORDING TO
THE ACTIVATED SLUDGE PROCESS
Filed Aug. 26, 1964
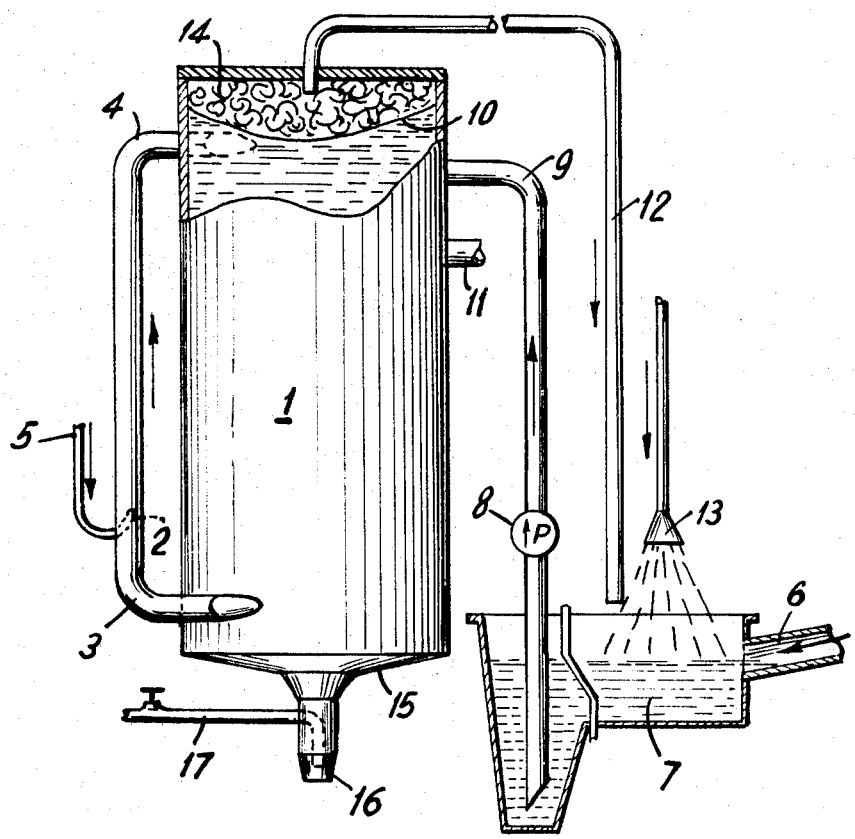
INVENTOR.
MAX DUBACH
BY
*McGlew & Toren*
ATTORNEYS United States Patent Office 3,390,076
Patented June 25, 1968

3,390,076
METHOD AND APPARATUS FOR SEWAGE DISPOSAL ACCORDING TO THE ACTIVATED SLUDGE PROCESS
Max Dubach, Riedholz, Soleure, Switzerland, assignor to Cellulosefabrik Attisholz A.-G. vorm. Dr. B. Sieber, Attisholz, Switzerland
Filed Aug. 26, 1964, Ser. No. 392,117
Claims priority, application Switzerland, Sept. 2, 1963, 10,840/63; Mar. 10, 1964, 3,072/64
12 Claims. (Cl. 210—3)

This invention relates to a method and apparatus for sewage disposal according to the activated sludge process, in which the water to be purified is continually fed to and drained from a container, and at the same time the liquid in the container is circulated through a bypass conduit arranged outside of the container and is enriched in the conduit by air with the oxygen needed for the process.

If the container should be kept within an economic size this enrichment of the sewage with oxygen is relatively slowly achieved. It is also impossible to speed up the enrichment at a given container-size by increasing the air supply as thus in a relatively short time an air-liquid-mixture is produced which is circulated uselessly. An economic duration of the sewage in the container thus may be achieved by the above mentioned method, only if the liquid drained from the container to be treated by the air jet is practically free of undissolved gases. An acceleration of enrichment with oxygen, however, is possible only if that the undissolved gases (mostly nitrogen) fed with the air are removed as quickly as possible.

It was noticed, furthermore, that especially when dealing with domestic sewage comprising strongly foaming substances, very stable liquid-foam-emulsions are built up. As the air contained by the emulsion needs a considerable amount of reaction volume the duration of the sewage to be treated is reduced considerably. As a consequence thereof the application of the mentioned method due to economic reasons is questionable as the production rate stands in no relation to the costs of the apparatus.

Moreover the strongly foaming substances, especially the detergents used more and more in modern washing agents, need a much longer time for biological disposal in the activated sludge process than the other organic pollutants in domestic sewage.

As the foam-liquid-emulsions are very stable the duration of the detergents in these cases is equal to that of the treated sewage. Thus only a very small amount of detergents can be removed. Therefore, they appear mostly again in the ditch, in which the treated domestic sewage is directed afterwards and may cause considerable disturbances in the biological balance in the waters.

These disadvantages are avoided with the process for sewage disposal according to the present invention, in which the water to be purified is continuously fed to and drained from a container while at the same time the liquid in the container is circulated through a bypass conduit arranged outside the container and is enriched in this conduit with oxygen by means of air. Additionally, in a cylindrical container, due to the passed water, the liquid is caused to rotate quickly around the axis of the container for promoting the separation of the undissolved gases in the liquid, for collecting foam mixed with the liquid, especially detergent foam, as big bubbled foam at the surface of the liquid in the container and for keeping surfaced solid materials in continuous movement.

This rotation is achieved preferably in that liquid drained from the container after being enriched with air is tangentially fed back into the container from the bypass conduit at the level of the liquid.

This quick rotation promotes a fast separation of the undissolved gases from the mixture, in that the produced centrifugal forces push the specific heavier parts of the mixture, especially the liquid and surfaced or granular solid materials suspended in the liquid, to the wall of the cylindrical container whereas the specific lighter parts of the mixture are gathered on the liquid surface around the axis of the container and may escape or be evacuated. Thus the formation of an air-liquid-emulsion in the whole container is effectfully hindered, so that it is possible to mix a much higher amount of air per time unit, as compared to the known process, thereby ensuring a considerable increase of the effect, as the undissolved gases, which are normally found in the emulsion, cannot diminish the reaction volume.

A further considerable advantage is for example oil that has leaked from an oil tank and soiled the sewage, due to its smaller specific weight, is collected on the surface of the liquid rotating in the container and not only becomes visible immediately but may be also removed easily.

Big bubbled foam, which collects at the surface of the liquid in the container when disposing of domestic sewage having a high content of strong foaming substances and which comprises a considerable percentage of the strong foaming substances of the original sewage in an enriched form, can be removed from the upper portion of the container and liquified by means of an appropriate device and in this liquified form returned again to the container. Thus the duration of hard to remove foamed substances, e.g., of detergents, in this system may be increased and, therefore, the biological disposal of these substances in relation to the known process can be considerably improved.

Granular fine materials, for example sand grains or the like, having a specific weight of more than 2 g./cm.$^3$, which reach the container with the liquid, despite the presence of sand catching devices in front of the container, are forced by centrifugal action developed by the quick rotation of the liquid to the interior wall of the container and sink slowly following a helical path to the container's bottom from where they may be removed periodically.

Surfaced, solid materials having a smaller specific weight, e.g., paper, rags and the like, are kept continually in motion by the rotation thus promoting their disposal and, additionally, providing the advantage that these materials cannot accumulate and cause any problems, e.g., blockings.

A further subject of this invention is an apparatus for carrying out the process according to the invention, comprising a container having a bypass conduit into which opens an air supply, the bypass conduit being arranged outside the container and having means for continuously withdrawing and returning liquid to be purified to the container, draining off therefrom, liquid to be purified, in which the bypass conduit is arranged and constructed so that by circulating the liquid through said bypass conduit the liquid in the container is caused to rotate quickly about the axis of the container.

The desired effect can be achieved in that the outlet from the bypass conduit and, if desired, its inlet is disposed at least approximately tangentially to the container and that the outlet opens into the container below the level of the liquid and preferably at the liquid level.

Additionally in such an apparatus with the container formed so that the granular solid materials, e.g., sand grains, contained in the rotating liquid are forced by the centrifugal forces to the wall of the container, where they slide downwardly along the wall to a collecting vessel from which they may be removed periodically, the arrangement of a special sand catcher in front of the aeration container, in which the biological disposal of the sewage is achieved, may be omitted. As a consequence thereof the cost of a plant for sewage disposal according to the activated sludge process of this type can be reduced considerably.

The lower end of the cylindrical aeration container may be tapered to form a trough with its lowest point on the axis of the cylinder for collecting the solid material which slides downwardly along the wall of the container.

Advantageously at the lowest point of the container a potlike collecting vessel is arranged for receiving the solid material.

This collecting vessel may be connected to an outlet pipe, which may be closed and the solid material in the collecting vessel may be emptied periodically through the outlet pipe.

The invention shall now be explained in more detail with reference to the accompanying drawing which diagrammatically represents an embodiment of an apparatus according to the invention for performing the method.

A closed cylindrical container 1 serves the known performance of the activated sludge process. Arranged outside the container is a bypass conduit consisting of a suction conduit 3, a pump 2, and a feeding conduit 4, into which opens an air feeding pipe 5. The sewage to be treated is supplied through a conduit 6 to an intermediate container 7 and then is pumped from the latter by a pump 8 through a conduit 9 into the container 1.

An outlet pipe 11 serves for the draining of the liquid from the container 1, and a valve (not shown) arranged in this outlet pipe 11 controls the amount of drained liquid in such manner that it is equal to the amount being supplied by pump 8 through conduit 9 into the container 1. In this way the level 10 of the liquid in the container is constantly maintained at approximately the same level.

The suction piece of the conduit 3 as well as the feeding piece of conduit 4 that opens immediately under the level 10, of the bypass conduit are connected tangentially to the container 1, so that when the pump 2 is operated it produces a strong rotation of the liquid in the container 1. By known means, for example as mentioned by appropriate regulation of the outflow through outlet pipe 11 the bypass conduit level 10 of the liquid in the container is always kept above the feeding piece 4 for the supply of air-liquid-mixture from the bypass conduit.

By the quick rotation of the liquid thereby produced about the axis of the container 1 the specific lighter materials, for example foaming materials and especially detergents, collected around the axis of the container in form of big bubbled foam 14 together with the undissolved gases from the air supply, and the separation from the liquid of the undissolved gases in the added air is facilitated and accelerated. This, in turn, ensures a much more intense aeration as compared to the previously known method without rotating liquid. The foam 14 may be drained, together with the escaping air, through a pipe 12 and returned to the intermediate container 7 where it is subjected to a water jet produced by a nozzle 13 and is liquefied and returned recirculated by pump 8 and through conduit 9 to the container 1.

Due to the fact that the materials that are difficult to dispose of, and practically only these materials, are circulated repeatedly through the plant, the effect of the activated sludge plant can be considerably increased as compared to the heretofore known plants and especially the biological disposal of the detergents can be considerably improved.

Even for sewage comprising no strong foaming substances the quick rotation according to the invention ensures considerable advantages over the process and apparatus known in the art, because the more intense aeration ensures an increased accumulation of oxygen in the liquid and thus a faster biological disposal. Further, by the rotation of the surfaced materials of lower specific weight, e.g., rags, paper and vegetable remains in the sewage, are kept continuously in motion so that no blockage can occur and their disposal is accelerated by their steady contact with air.

Due to the rapid rotation of the liquid in the container 1 and the centrifugal forces generated granular, solid materials of a specific weight, of, e.g., more than 2 g./cm.$^3$, and especially sand, fed into the container are forced against the wall of the container, and then glide downwardly in a helical path while the materials of a lower specific weight remain in suspension.

According to the invention the container is designed in a way that the solid materials gliding downwardly along the container wall collect in a collecting vessel. To this end the bottom of the container 1 may be formed as a trough or tapered in the shape of a cone whereas advantageously the lowest point of this collecting vessel is on the axis of the cylindrical container.

In the illustrated embodiment an axially arranged collecting pot is disposed in the bottom of the container 1 and its upper edge is connected by inclined walls 15 with the lower ends of the walls of the container 1. A blockable draining pipe 17 extends into this collecting pot 16 from outside the container and through this draining pipe 17 the solid materials gathered in the collecting pot 16 can be removed, for example sucked off, periodically.

I claim:

1. A method of treating sewage according to the activated sludge process in which sewage is placed in a vertically oriented volume having a liquid level therein dividing the volume into a liquid space and a gas collection space and comprising the steps of tangentially removing sewage from the lower end of the liquid space in the volume, mixing air with the removed sewage, tangentially feeding the mixture of air and sewage into the liquid space of the volume at the liquid level whereby the volume of sewage is given a strong whirling motion about the vertical axis of the volume, collecting foam and undissolved gases in the gas collection space in the volume above the liquid level, removing the foam and undissolved gases from the collection space and delivering the foam and undissolved gas to a separate volume, liquefying the foam in the separate volume and recirculating the liquefied foam to the liquid space in the vertically oriented volume.

2. A method of treating sewage as set forth in claim 1 comprising the steps of supplying sewage to be treated into the liquid space in the volume and draining treated sewage from the liquid space in the volume at a rate substantially equal to the rate at which the sewage is supplied to the liquid space.

3. A method of treating sewage as set forth in claim 1 comprising the step of conducting solid materials having a specific weight greater than 2 g./cm.$^3$ to the outer edge of the whirling liquid volume and directing the solid materials downwardly to the lower end of the liquid space.

4. A method of treating sewage as set forth in claim 1 comprising the step of collecting solid material having a specific gravity of less than 2 g./cm.$^3$ at the liquid level in the volume and maintaining the lower specific gravity solid materials in constant rotation at the liquid level.

5. Apparatus for treating sewage according to the activated sludge process comprising a vertically oriented closed container divided by a liquid level into a liquid space below a gas collection space, an inlet located below the liquid level for feeding sewage into said container, an outlet located below the liquid level for removing sewage from said container, a vertically arranged bypass conduit having an inlet and an outlet thereto tangentially connected to said vertically oriented closed container, said conduit outlet connected into said closed container at the liquid level for discharging directly into the liquid space therein and said conduit inlet spaced below said conduit outlet, means for supplying air into said conduit for mixing with the sewage passing therethrough, and pump means located in said bypass conduit for circulating sewage from its inlet to its outlet whereby a strong rotational effect is imparted to the sewage within said closed container by the tangential injection of the sewage from said bypass conduit into said closed container at the liquid level.

6. Apparatus as set forth in claim 5 wherein the base of said container has inwardly sloping surfaces.

7. Apparatus as set forth in claim 6 wherein a sump is centrally located in the base of said closed container for collecting solid material and means secured to said container and extending into said sump for removing solid materials therefrom.

8. Apparatus as set forth in claim 5, wherein a centrally positioned outlet is disposed in the top of said container for removing foam and undissolved gases from said gas collection space.

9. Apparatus as set forth in claim 8, comprising a second container for holding sewage to be supplied to said closed container.

10. Apparatus as set forth in claim 9, comprising a pipe connected to said centrally positioned outlet in the top of said closed container and extending therefrom into said second container for delivering foam and undissolved gases thereto.

11. Apparatus as set forth in claim 10, comprising spray means associated with said second container for liquefying the foam delivered into said second container.

12. Apparatus as set forth in claim 11, wherein a conduit is connected at one end to said inlet for feeding sewage into said closed container and at its other end to said second container, and a pump arranged in said conduit for withdrawing sewage from said second container and for delivering it into said liquid space in said closed container.

References Cited
UNITED STATES PATENTS

| | | | |
|---|---|---|---|
| 2,326,303 | 8/1943 | Moerk et al. | 210—14 |
| 3,220,706 | 11/1965 | Valdespino | 210—15 |
| 3,224,964 | 12/1965 | Derenk et al. | 210—15 |
| 3,232,434 | 2/1966 | Albersmeyer | 210—17 |
| 3,271,304 | 9/1966 | Valdespino et al. | 210—14 |

MICHAEL E. ROGERS, *Primary Examiner.*